Patented Oct. 27, 1953

2,657,155

UNITED STATES PATENT OFFICE 2,657,155

PROCESS OF FORMING AN INSOLUBLE COATING

Jan Lolkema, Hoogezand, Netherlands, assignor to Naamlooze Venootschap: W. A. Scholten's Chemische Fabrieken, Groningen, Netherlands, a corporation of the Netherlands No Drawing. Application May 28, 1948, Serial No. 29,945. In the Netherlands May 30, 1947

6 Claims. (Cl. 117—84)

The invention relates to a process of producing water insoluble layers on carriers which is characterized by the fact that the said layers consist of water insoluble salts of starch ether carboxylic acids and/or starch ester carboxylic acids with a polyvalent metal ion.

By the expression "starch ether carboxylic acids and/or starch ester carboxylic acids" I understand starch ethers, esters and/or mixed ether-esters containing one or more free carboxyl-groups in the ether and/or ester group(s).

The ether carboxylic acids may be obtained by etherifying starch with hydroxy carboxylic acids, while the ester carboxylic acids are obtained by partially esterifying starch with polybasic carboxylic acids. The etherifying or esterifying treatment may be carried out according to known methods. A suitable method of preparing the starch ether carboxylic acids is e. g. the etherification of starch in an alkaline medium with halogen carboxylic acids. It is, however, also possible to carry out the etherifying treatment with other etherifying agents, such as glycidic acid or methylglycidic acid salts. The ethers may or may not be freed from the salts formed during the reaction, e. g. by precipitation with alcohol. A very simple and economical method of preparing the starch ether carboxylic acids is described in U. S. Patent No. 2,459,108, granted January 11, 1949, and the products obtained by the said method are therefore preferably used for the present purpose.

I also use ether carboxylic acids which in addition to the carboxy alkoxy group also contain other ether groups. They may be obtained e. g. by etherifying starch both with a halogen carboxylic acid and an epoxy alkane, either simultaneously or successively in any desired sequence. The starch may be treated either before, or during or after the etherifying treatment, with aldehydes, more particularly with formaldehyde, e. g. according to U. S. patent application Serial No. 707,321, now U. S. Patent 2,575,423, issued November 20, 1951.

The ester carboxylic acids may be obtained e. g. by partially esterifying starch with anhydrides of dibasic carboxylic acids, such as phthalic acid, succinic acid or maleic acid anhydride.

It is also possible to use compounds containing both ether and ester groups.

In the present application the term "starch" includes the various kinds of native starches, starch derivatives such as soluble starch, dextrin, cold swelling starch and the like, and starch containing products, such as natural or artificial mixtures of starches and starch derivatives with proteins or proteins and cellulose, such as e. g. wheat, rye, buckwheat and the like.

The polyvalent metal salts producing insoluble compounds with the starch ether or starch ester carboxylic acids, are preferably those derived from tri- or polyvalent metals, especially aluminium, ferric and chromic salts.

There are several methods of producing insoluble layers on carriers from the said starch ether or ester carboxylic acids and salts of polyvalent metals. The preferred method consists in first treating the carrier with a solution of a salt of the said carboxylic acid having the property of swelling or dissolving in water and subsequently with a solution of the salt of the polyvalent metal.

If desired a drying treatment may be applied between the said two treatments. Metal salts of inorganic acids, e. g. sulphates, are preferably used for the said purpose.

The solution of the polyvalent metal salt also contains paraffin or a fatty substance in emulsified condition.

I may e. g. carry out an after-treatment with a paraffin emulsion containing aluminium formate, whereby besides the water resistant effect a water repelling effect is obtained.

I may also use combinations of the substances indicated above with other salts, soluble or swelling in water, of natural or synthetic products containing free carboxyl groups, whereby special effects may be produced, e. g. a greater resistance to water or an increased suppleness of the film and the like. As examples of such products I may mention cellulose ether carboxylic acids and cellulose ester carboxylic acids, alginic acid, abietic acid, fatty acids of high molecular weight, polymethacrylic acid, shellac and the like. In so far as they are acids, they may be added to the solution of the starch ether or ester carboxylic acid, in the form of a water soluble salt, so that in combination with the solution of the polyvalent metal salt they will form an insoluble compound on the carrier. If desired, I may also add other binding agents, such as casein.

For certain purposes the resistance to water and the stability of the layers formed may be increased by adding a small quantity of a synthetic resin of the polycondensation type, e. g. a urea, melamine, or phenol resin. The said resins may be used either or not in the form of a precondensate.

The formation of insoluble layers on carriers according to the invention may be utilized for various purposes, e. g. for finishing and sizing textile materials, for thickening and fixing purposes in the art of printing on paper or on textile materials, for internally or externally sizing paper, for binding all kinds of pulverulent, granular or fibrous materials (priming agents, water colours, briquettes, cork substitutes, fibre and artificial wood plates, etc.) and in the industry of adhesives and the like. A valuable application of the invention is the manufacture of printed washable wall paper and of water or weather proof pasteboard for packing purposes.

The invention will be illustrated by the following examples:

Example 1

2000 parts by weight of tapioca starch, 3000 parts by volume of water and 420 parts by weight of a 29% caustic soda solution are intimately mixed while being heated to a temperature of 70° C. The hot alkaline starch paste is admixed with a solution of the sodium salt of monochloroacetic acid, obtained by carefully neutralizing a solution of 300 parts by weight of commercial monochloroacetic acid in 100 parts by volume of water with a concentrated caustic soda solution. The reaction mass is subsequently heated while stirring for one and a half hours to a temperature of between 70° and 80° C., whereupon the entire mixture is dried in the manner described in U. S. Patent No. 2,459,108 granted January 11, 1949, now Reissue Patent No. 23,443.

10 parts by weight of the dry starch ether carboxylic acid in the form of the sodium salt thus prepared are mixed with 100 parts by weight of china clay. The mixture is added to 70 parts by volume of cold water and agitated until a homogeneous, thickened mass is obtained. This mass is diluted to the consistency required for application by means of a brush by the addition of 40–60 parts by volume of water. The mixture thus prepared is used as a coating for paper which is dried and submitted to a light calendering treatment.

The layer thus applied is subsequently treated with a 5% solution of aluminium sulphate and dried once more. It appears that the filler is fixed so as to be waterproof.

The greater or lesser resistance to water with which a pigment or a filler is fixed on the carrier depends on the amount of binding agent used. It is therefore possible to apply the pigment or the filler by using larger quantities of the binding agent than those indicated above, in such a way that besides being waterproof, it is resistant to abrasion even in a wet condition. The number of carboxyl groups introduced into the starch macromolecule will also influence the said phenomena.

Example 2

20 parts by weight of pulverized shellac are dissolved in a mixture of 2 parts by volume of a strong ammonia solution and 38 parts by volume of water by heating in a boiling waterbath.

After having been filtered through a cotton fabric the viscous solution thus obtained is diluted with water, until the total weight amounted to 80 parts by weight.

40 parts by weight of the shellac solution thus prepared are mixed with 70 parts by weight of a solution obtained by dissolving 10 parts by weight of the sodium salt of the starch ether carboxylic acid described in Example 1 in 60 parts by volume of cold water. The mixture is diluted with 30 parts by volume of water to the consistency required for being applied by means of a brush.

A length of paper is coated with the said solution, dried, submitted to an after-treatment with a 10% solution of aluminium sulfate and dried once more. The coating applied to the paper proves to be very water resistant. Similar results are obtained by combining a starch ether carboxylic acid with the sodium salt of colophonium.

Example 3

2500 parts by weight of potato starch, 2500 parts by volume of hot water and 275 parts by volume of a 30% solution of caustic soda are intimately mixed while stirring. To the hot, alkaline starch paste there is added a solution of the sodium salt of monochloroacetic acid, obtained by neutralizing 250 parts by weight of commercial monochloroacetic acid in 100 parts by volume of water with a 30% caustic soda solution. After the addition of the etherifying agent, the reaction mixture is heated while stirring to a temperature of between 60 and 70° C. for somewhat more than an hour, whereupon 1000 parts by weight of casein are added.

The mixture is stirred until a smooth mass is obtained which is subsequently dried in the manner described in Example 1.

A 10–15% solution of the product thus obtained is very appropriate for producing water resistant layers on carriers of various nature, if the coating applied to the carrier is submitted after drying to an after-treatment with a solution of a polyvalent metal salt, such as chloride of tin, or aluminium sulphate.

I claim:

1. A process of coating a water insoluble, water repellent coating upon the surface of a base material, comprising, applying an aqueous solution of a water soluble salt of an acid selected from the group consisting of starch ether carboxylic acid and starch ester carboxylic acid to said surface of said base and thereafter coating the so treated base with an aqueous solution of a polyvalent metal salt selected from the group consisting of water soluble salts of aluminum, ferric iron, chromic chromium, and tin, and forming a water insoluble salt with the acid applied in the first coating, said metal salt solution having emulsified therein a water repellent paraffin material.

2. A process as in claim 1 wherein the coating from the water soluble salt of the acid selected from the group consisting of starch ether carboxylic acids and starch ester carboxylic acids is dried before coating the so treated base with an aqueous solution of the polyvalent metal salt.

3. A process as in claim 1 in which the polyvalent metal salt is a water soluble aluminum salt.

4. A process as in claim 1 wherein the water soluble polyvalent metal salt is a chromium salt.

5. A process as in claim 1 wherein the water soluble polyvalent metal salt is a ferric salt.

6. A process as in claim 1 wherein the water soluble polyvalent metal salt is a tin salt.

JAN LOLKEMA.

References Cited in the file of this patent

UNITED STATES PATENTS

| Number | Name | Date |
|---|---|---|
| 2,087,237 | Bolton | July 20, 1937 |
| 2,146,755 | McNally et al. | Feb. 14, 1939 |
| 2,148,951 | Maxwell | Feb. 28, 1939 |
| 2,154,220 | Sponsel | Apr. 11, 1939 |
| 2,171,222 | Meyer | Aug. 29, 1939 |
| 2,331,859 | Roberts | Oct. 12, 1943 |
| 2,426,300 | Edelstein | Aug. 26, 1947 |
| 2,451,686 | Moller et al. | Oct. 19, 1948 |
| 2,459,108 | Lolkema | Jan. 11, 1949 |